United States Patent
Henn et al.

(10) Patent No.: US 10,526,241 B2
(45) Date of Patent: Jan. 7, 2020

(54) SCRATCH-RESISTANT COATINGS WITH IMPROVED CLEANABILITY, SUBSTRATES WITH SCRATCH-RESISTANT COATINGS WITH IMPROVED CLEANABILITY, AND METHODS FOR PRODUCING SAME

(71) Applicant: SCHOTT AG, Mainz (DE)

(72) Inventors: Christian Henn, Frei-Laubersheim (DE); Franziska Back, Schweinfurth (DE); Jochen Herrmann, Mainz (DE)

(73) Assignee: SCHOTT AG, Mainz (DE)

( * ) Notice: Subject to any disclaimer, the term of this patent is extended or adjusted under 35 U.S.C. 154(b) by 283 days.

(21) Appl. No.: 15/283,053

(22) Filed: Sep. 30, 2016

(65) Prior Publication Data

US 2017/0096365 A1    Apr. 6, 2017

(30) Foreign Application Priority Data

Oct. 1, 2015 (DE) .......... 10 2015 116 644

(51) Int. Cl.
 *C03C 17/22* (2006.01)
(52) U.S. Cl.
 CPC ...... *C03C 17/225* (2013.01); *C03C 2217/281* (2013.01); *C03C 2217/78* (2013.01); *C03C 2218/156* (2013.01)
(58) Field of Classification Search
 None
 See application file for complete search history.

(56) References Cited

U.S. PATENT DOCUMENTS

| 2009/0017314 A1 | 1/2009 | Nadaud |
| 2013/0209762 A1 | 8/2013 | Damm et al. |
| 2014/0065368 A1 | 3/2014 | Aytug |
| 2015/0284840 A1 | 10/2015 | Henn et al. |

FOREIGN PATENT DOCUMENTS

| DE | 102005055035 | 5/2007 |
| DE | 102011081234 | 2/2013 |
| EP | 1705162 | 9/2006 |
| WO | 2006099765 | 9/2006 |

OTHER PUBLICATIONS

Ait Aissa et al. "Comparison of the structural properties and residual stress of AlN films deposited by dc magnetron sputtering and high power impulse magnetron sputtering at different working pressures," Thin Solid Films 550 (2014) 264-267 (Year: 2014).*

(Continued)

*Primary Examiner* — David Sample
(74) *Attorney, Agent, or Firm* — Ohlandt, Greeley, Ruggiero & Perle, L.L.P.

(57) ABSTRACT

A substrate having a scratch resistance enhancing coating with improved cleanability and methods for producing such a coating are provided. The coating includes at least one high refractive index transparent hard material layer and includes aluminum nitride. The coating exhibits a contact angle for water of greater than 75°.

21 Claims, 7 Drawing Sheets
(2 of 7 Drawing Sheet(s) Filed in Color)

(56) References Cited

OTHER PUBLICATIONS

Dumitru et al.: "Aluminum Nitride Films for Optical Applications" In: 1996 International Semiconductor Conference, 1997, pp. 641-644.
Ishihara et al., Control of Preferential Orientation of AlN Films Prepared by the Reactive Sputtering Method, Thin Solid Films, vol. 316, 1998, pp. 152-157.
Lewin et al.: "Comparison of Al—Si—N nanocomposite coatings deposited by HIPIMS and DC magnetron sputtering" Elsevier, Surface and Coatings Technology, No. 232, 2013, pp. 680-689.
Pelisson et al.: "Microstructure and mechanical properties of Al—Si—N transparent hard coatings deposited by magnetron sputtering" Elsevier, Surface and Coatings Technology, No. 202, 2007, pp. 884-889.
Yang, "Effect of Annealing Temperature on the Water Contact Angle of PVD Hard Coatings", Journal Materials, vol. 5, Aug. 7, 2013, pp. 3373-3386.

\* cited by examiner

SCRATCH-RESISTANT COATINGS WITH IMPROVED CLEANABILITY, SUBSTRATES WITH SCRATCH-RESISTANT COATINGS WITH IMPROVED CLEANABILITY, AND METHODS FOR PRODUCING SAME

CROSS REFERENCE TO RELATED APPLICATIONS

This application claims benefit under 35 U.S.C. § 119(a) of German Patent Application No. 10 2015 116 644.5 filed Oct. 1, 2015, the entire contents of which are incorporated herein by reference.

BACKGROUND

1. Field of the Invention

The invention generally relates to scratch-resistant coatings with improved cleanability, to substrates having scratch-resistant coatings that are easily cleaned, and to methods for producing such coatings. More particularly the invention relates to scratch-resistant coatings known as "easy-to-clean" coatings and to coated substrates having a hard material layer based on aluminum nitride, and to the manufacturing thereof, in particular by sputtering.

2. Description of Related Art

Various coatings for increasing scratch resistance are known from the prior art. For example, patent application DE 10 2011 081 234 A1 discloses a hard material coating on glass ceramic substrates, which has two different material phases. However, a disadvantage thereof is that the coefficient of thermal expansion of the coating and of the substrate must not differ by more than 20%. Moreover, since glass ceramics have a very low coefficient of thermal expansion, this considerably limits the number of suitable coatings. For example, the coefficient of thermal expansion of hard material layers based on nitrides or oxides, such as boron nitride is too high, so that these materials cannot be used for coating glass ceramic substrates.

A coating for enhancing scratch resistance should not only exhibit high hardness. Rather, other decisive factors for the quality of a scratch-resistant coating or of a substrate coated therewith include elasticity (modulus of elasticity), surface roughness, stress in the layer due to different coefficients of thermal expansion of the substrate and the coating, and surface properties of the substrate. Moreover it is desirable that in addition to high scratch resistance, surfaces coated accordingly such as glass or glass ceramic surfaces exhibit high resistance to wearing and polishing stress which occurs during manufacturing and also during subsequent use.

Besides increased scratch resistance, improved cleanability of the coating is relevant as well. This is particularly true for application areas such as cooktops, for which in part heavy contamination can be expected in daily use. Such contaminations must be removed from the surface without damaging the coating. Moreover, easy removal of contaminations is desired by the consumer as well. Appropriately equipped surfaces are referred to as easy-to-clean surfaces. Such surfaces have a larger contact angle compared to the non-coated substrate.

SUMMARY

An object of the invention is to provide a coating and a substrate coated accordingly, which besides high scratch resistance and enhanced resistance to wearing and polishing stress and to environmental stress moreover exhibit improved cleanability. Another object of the invention is to provide an appropriate manufacturing method therefor.

The object of the invention is achieved in a surprising manner by the subject matter of the present application. Advantageous embodiments and modifications of the invention are specified herein.

The coating of the invention comprises a transparent high refractive index hard material layer on the basis of aluminum nitride (AlN), i.e. the hard material layer contains AlN as a substantial component. According to the invention, the proportion of AlN in the hard material layer is greater than 50 wt %.

The hard material layer is furthermore effective as a wear protection layer. The hard material layer may have both an amorphous and a crystalline or partially crystalline structure. Surprisingly, the inventors have found that a very scratch-resistant coating which is furthermore resistant to wearing and polishing stress can be obtained when the AlN of the hard material layer is crystalline or at least substantially crystalline and has a hexagonal crystal structure. In particular, the AlN layer has a degree of crystallization of at least 50%.

This is surprising since usually it is assumed that due to the absence of crystallites amorphous coatings exhibit a lower surface roughness than corresponding crystalline coatings. Low roughness of the layer is associated with lower susceptibility to the occurrence of defects such as those which are for example caused by friction of a foreign body on the surface of the coating. However, such a crystalline or partially crystalline coating not only exhibits high scratch resistance but also enhanced resistance to environmental influences and to polishing and wearing stress. According to one embodiment, the hard material layer has a mean roughness Ra of less than 1.3 nm, preferably <1.2 nm, and more preferably <1 nm. According to one embodiment of the invention, the average effective value of the ordinates of the roughness profile RMS is less than 2 nm, preferably less than 1.5 nm, and most preferably less than 1.3 nm.

Moreover, despite of its crystalline structure the coating is transparent for light of wavelengths in the visible and infrared spectral range, so that the coating is visually unobtrusive and can for instance be used in optical components and as a coating for cooktops. In particular, the coating has a transmittance for visible light of at least 50%, preferably at least 80%, based on standard illuminant C, and a transmittance for infrared light of at least 50%, preferably at least 80%.

The hard material layer is a high refractive index layer. For example, in one embodiment the hard material layer has a refractive index in a range from 1.8 to 2.3, preferably in a range from 1.95 to 2.1, at a wavelength of 550 nm.

Such a high transmittance of the partially crystalline and crystalline coatings can in particular be achieved due to the small size of the individual crystallites. For example scattering effects are avoided due to the small size. In one embodiment of the invention, the average crystallite size is at most 20 nm, preferably at most 15 nm, and more preferably from 5 to 15 nm. A further advantage of the small crystallite size is a higher mechanical resistance of the layer containing the crystallites. Larger crystallites often have an offset in their crystal structure, for example, which adversely affects mechanical resistance.

According to one embodiment of the invention, the AlN crystallites in the hard material layer have a hexagonal crystal structure with a predominant (001) preferred orientation, i.e. in parallel to the substrate surface. In a crystal structure that exhibits a preferred orientation, one of the symmetry orientations of the crystal structure is preferably adopted by the crystallites. In the context of the invention, an AlN crystal structure having a (001) preferred orientation in particular refers to a crystal structure which exhibits a maximum reflection in a range between 34° and 37° in an XRD spectrum of an X-ray diffraction measurement. The reflection in this range can be associated with an AlN crystal structure having a (001) preferred orientation.

Surprisingly, it was found that embodiments of the hard material layers according to the invention having a (001) preferred orientation exhibit both a higher modulus of elasticity and a greater hardness than hard material layers having an identical or similar composition but without (001) preferred orientation.

The high modulus of elasticity of the coating having a predominant (001) preferred orientation may be explained by the fact that the modulus of elasticity of a crystalline material depends on the preferred orientation thereof. So, in this embodiment of the hard material layer according to the invention the modulus of elasticity is greatest in parallel to the substrate surface. In one embodiment of the invention, the hard material layers have a modulus of elasticity in a range from 90 to 250 GPa, preferably in a range from 110 to 200 GPa, at a test load of 10 mN in parallel to the substrate surface.

The coatings according to the invention have a contact angle for water of >75°. Surprisingly it was found that for the coatings of the invention contamination adhering to the surface can be easily detached, i.e. cleanability is excellent, which is referred to as an easy-to-clean effect.

This is in part attributable to the low roughness of the coating. Due to the relatively smooth surface of the coating, no or only slight mechanical interlocking will occur between the surface and the particles adhering thereon. Only very low static friction forces are effective between the coating and surfaces thereof. The coefficient of static friction $\mu$ is preferably less than 0.24, more preferably <0.2. Sliding friction forces that have to be applied are also small, for example the sliding friction parameter $\mu$ is preferably <0.2, more preferably <0.15, and most preferably <0.12. The low friction forces may have the effect that in the case of surfaces coated according to the invention contaminants will poorly adhere to the surface of the coating and can be removed with relatively little effort. Moreover, because of the low friction items are easily moved on the surface, for example pots. This is particularly advantageous if the substrates coated according to the invention are employed as cooktops.

The coating of the invention has a low surface energy. According to one embodiment, the coatings exhibit dispersive and/or polar surface energies of <50 mN/m, preferably even less than 40 mN/m, or even less than 30 mN/m.

Due to the low surface energies, the coatings of the invention are not or very difficultly wetted by polar compounds. The coatings exhibit poor wettability to both aqueous and non-polar organic liquids such as diiodomethane or ethylene glycol. Therefore, relevant contaminations are easily removed from the surface of the coating. According to one embodiment, the coating has a contact angle for water of >75°, preferably >80°, and more preferably >85°, and/or has a contact angle for polar organic solvents such as ethylene glycol or iodomethane of >55°, preferably >60°. In one embodiment, the contact angle for ethylene glycol is ≥70°, preferably ≥75°, and/or the contact angle for diiodomethane is ≥55°, preferably ≥60°. The low surface energy and the large contact angles therefore provide for easy cleaning of the coatings, so that the coatings exhibit an easy-to-clean effect.

The surface energy of a solid depends on its orientation. It can therefore be assumed that in case of crystalline or partially crystalline coatings the (001) preferred orientation contributes to the low surface energies.

Scratch resistance of a coating not only depends on hardness but also depends on how well the coating adheres to the substrate. Furthermore, if the coating and the substrate have different coefficients of thermal expansion, this may induce stresses in the coating and may cause flaking of the coating. In coatings having a comparatively high modulus of elasticity, induced stresses will be better absorbed so that the coating will better adhere to the substrate.

The resistance of the coating to abrasion further depends on the ratio of hardness to the modulus of elasticity of the respective layer. In one embodiment of the invention, the crystalline or partially crystalline coatings have a ratio of hardness to modulus of elasticity of at least 0.08, preferably 0.1. This can be achieved by the (001) preferred orientation. Layers of similar composition but with a different preferred orientation exhibit comparatively low values in a range from 0.06 to 0.08.

The properties described above may in particular be achieved when the (001) preferred orientation of the crystal structure is most pronounced as compared to the (100) and (101) orientations. In addition, in one embodiment of the invention the proportion of (100) oriented crystal structures is greater than the proportion of (101) oriented crystal structures.

The proportion of the crystal structure having a (001) preferred orientation may be determined as follows: acquiring a grazing incidence XRD (GIXRD) spectrum of the respective layer, i.e. thin film X-ray diffraction; determining the maximum intensity of the corresponding (001) reflection $I_{(001)}$ in the range between 34° and 37°; determining the maximum intensity of the (100) reflection $I_{(100)}$ in the range between 32° and 34°; determining the maximum intensity of the (101) reflection $I_{(101)}$ in the range between 37° and 39°.

The proportion of the crystal structure exhibiting the (001) preferred orientation, $x_{(001)}$ and $y_{(001)}$, is calculated as follows:

$$x_{(001)} = I_{(001)}/(I_{(001)} + I_{(100)}); \text{ and}$$

$$y_{(001)} = I_{(001)}/(I_{(001)} + I_{(101)}).$$

A proportion $x_{(001)}$ and/or $y_{(001)}$ of greater than 0.5, preferably greater than 0.6, and more preferably greater than 0.75 has been found particularly advantageous.

Another advantage of the AlN-based layer is its relatively high thermal conductivity which is particularly advantageous in the case where the inventive coating is applied on cooktops for scratch protection purposes.

In one embodiment of the invention, the proportion of oxygen in the AlN-based layer is at most 10 at %, preferably at most 5 at %, and more preferably at most 2 at %.

The low oxygen content in the coating prevents a formation of oxynitrides which would have a detrimental effect on crystal growth and in particular on the formation of a preferred orientation of the crystal structure.

The properties of the hard material layer described above may in particular be achieved if the coating is applied by a sputtering process.

Hardness and scratch protection performance of a layer according to the invention may furthermore be improved by a treatment after deposition thereof. Besides a simple thermal treatment in a furnace, flash lamp heating or a laser treatment may be employed. Ion or electron implantation is also conceivable. In this way it is possible to obtain a (001)

preferred orientation of the crystal structure, or the fraction $x_{(001)}$ and/or $y_{(001)}$ thereof in the crystal structure may be further increased.

The AlN-based layer or hard material layer may be a pure aluminum nitride layer, or the hard material layer may include other components in addition to the aluminum nitride, for example one or more other nitrides, carbides and/or carbonitrides. Preferably, the nitrides, carbides, or carbonitrides comprise respective compounds of elements selected from the group consisting of silicon, boron, zirconium, titanium, nickel, chromium, and carbon. This permits to further modify properties of the hard material layer such as hardness, modulus of elasticity, and abrasion resistance, e.g. resistance to polishing.

For the purpose of forming a crystalline aluminum nitride phase, an aluminum content of the hard material layer of >50 wt %, preferably >60 wt %, and more preferably >70 wt % is especially advantageous, with respect to the additional elements silicon, boron, zirconium, titanium, nickel, chromium, and/or carbon in each case.

Respective mixed layers are referred to as doped AlN-based layers in the context of the invention. The compounds included in addition to AlN are referred to as a dopant within the meaning of the invention, and the content of dopants may amount to up to 50 wt %. Even layers having a dopant content of up to 50 wt % are regarded as doped layers in the context of the invention.

In mixed layers or doped AlN-based layers, AlN crystallites are embedded in a matrix of the dopant. The degree of crystallization of the layer may therefore be adjusted through the amount of the dopant in the mixed layer. Moreover, the crystallite size is limited by the matrix. A crystallite size of not more than 20 nm, preferably not more than 15 nm has been found particularly advantageous. In particular, the average size of the AlN crystallites is in a range from 5 to 15 nm. This crystallite size ensures high transmittance and mechanical resistance of the hard material layer.

In one embodiment of the invention, the hard material layer contains boron nitride in addition to the aluminum nitride, i.e. the layer is doped with boron nitride. Due to the boron nitride included, the friction coefficient of the layer is reduced, which in particular results in a higher resistance of the layer to polishing processes. This is advantageous both in terms of the resistance of an accordingly coated substrate when used by the end user and also in terms of possible process steps during the further processing of the coated substrate.

In another embodiment of the invention, the hard material layer is doped with silicon nitride, that means an AlN:SiN material system is provided which permits to influence individual properties such as adhesion, hardness, roughness, friction coefficient, and/or thermal stability. In one modification of this embodiment, the hard material layer includes at least one further dopant.

Furthermore, the coefficient of thermal expansion of the hard material layer may be influenced by the type and amount of the dopant used or may be matched to the substrate.

According to one embodiment of the invention it is contemplated that the coating comprises at least one further layer in addition to the hard material layer. According to one embodiment of the invention, the coating may include an adhesion promoting layer which is arranged between the substrate and the hard material layer so as to improve the adhesion of the hard material layer on the substrate. This is particularly advantageous in a case where the coefficients of thermal expansion of the substrate and the hard material layer differ significantly. Adhesion promoting layers made of nitrides and/or oxides and/or carbides and/or carbonitrides and/or oxynitrides of any of the elements aluminum, silicon, boron, zirconium, titanium, nickel, chromium, and/or carbon have been found particularly useful for this purpose.

The adhesion promoting layer may reduce arising stresses, at least it causes a strong chemical bonding to the substrate. Therefore, close matching of the coefficients of thermal expansion of the substrate and the hard material layer is not necessary. This allows for a wide range of suitable substrate materials. Deposition may be accomplished by PVD, CVD, or sol-gel processes, for example.

Thus, substrates that can be used include in particular glasses, preferably sapphire glasses, borosilicate glasses, aluminosilicate glasses, lime-soda glasses, synthetic quartz glasses (known as fused silica glasses), lithium aluminosilicate glasses, and optical glasses. Crystals for optical applications, such as potassium fluoride crystals, or glass ceramics may also be used as the substrate. The substrates can be transparent, translucent, or opaque, colorless or can be stained as well.

In a preferred embodiment, the substrate is a glass ceramic, in particular a glass ceramic having a coefficient of thermal expansion $\alpha_{2\ 0\text{-}300}$ of less than $2*10^{-6}$ K$^{-1}$. Such glass ceramics can be used as cooktops, for example. Moreover, since the coatings of the invention permanently resist temperatures of at least 300° C., preferably at least 400° C., the coating may even be applied on the hot zones of the cooktop. In particularly if the coated substrate is used as a cooktop it will typically often be contaminated, for example due to over-boiling pots placed on the cooktop. Because of the high temperatures, this contamination may partially be decomposed or burned, so that particularly stubborn stains may result. Due to the coating according to the invention, however, they can easily be removed mechanically.

Due to its high temperature stability, the coating or glass substrates coated therewith can be used in other hot areas, for example as an oven viewing window.

In particular in the case of cooktops, often a decor is printed on the glass ceramic surface. Therefore, according to one embodiment it is contemplated that the substrate is provided with a decorative layer, at least partly, and that the decorative layer is disposed between the substrate and the coating. Due to the high transmittance of the coating according to the invention the decor is well perceived through the coating. In addition, the hard material layer protects the decorative layer from mechanical stress, so that less stringent requirements in terms of mechanical strength need to be imposed on the decorative layer. Moreover, the easy-to-clean property, i.e. good cleanability of the hard material layer can be conferred to the entire coating in this manner.

The substrate coated with the hard material layer according to the invention can be used in particular as an optical component, a cooktop, viewing window in the automotive sector, for watch glasses, glass or glass ceramic components in household appliances, oven viewing windows, or as a display, e.g. for tablet PCs or mobile phones, especially as a touch-sensitive display.

a) The hard material layers or a substrate coated with a crystalline or partially crystalline structure with (001) preferred orientation may be produced in particular by a method which comprises at least the steps of: a) providing a substrate in a sputtering apparatus that includes an aluminum containing metal target; and b) releasing sputtered particles at a power in a range from 8 to 1000 W/cm², preferably from 10 to 100 W/cm² per target surface area in a reactive gas atmosphere.

The coating process of the substrate in step b) is performed at process pressures of less than or equal to $2*10^{-2}$ mbar. Preferably a nitrogen-containing reactive gas is used as the process gas. Nitrogen-containing reactive gas herein refers to a gas which cleaves nitrogen under the sputtering conditions. It has been found particularly advantageous to use nitrogen or ammonia. In one embodiment of the invention, acetylene may be used as a reactive gas, alternatively or additionally, especially if the target further comprises nitrides.

It has been found particularly advantageous for the reactive gas to have a purity of at least 99.999%. This allows to obtain particularly pure layers, in particular layers with a very low oxygen content. This is particularly advantageous with regard to the formation of a (001) preferred orientation in crystalline or partially crystalline embodiments.

The coating process in step b) is performed at high sputtering powers. In the method according to the invention, sputtering powers are at least from 8 to 1000 W/cm², preferably at least from 10 to 100 W/cm². In one embodiment of the invention, magnetron sputtering or a high power impulse magnetron sputtering (HiPIMS) process is employed. Alternatively or additionally, a negative voltage or an AC voltage may be maintained between the target and the substrate. Alternatively or additionally, the coating process may be performed with ion bombardment assistance, preferably ion bombardment from an ion beam source, and/or by applying a voltage to the substrate.

The particles generated by the sputtering process may be deposited already at deposition temperatures of only 50° C. and above or even at 20° C. and above. According to one embodiment of the invention, the deposition temperature is in the range from 20 to 100° C. However, higher deposition temperatures of, for example, greater than 100° C. or greater than 200° C. are possible. Higher deposition temperatures may have an advantageous effect on the temperature stability of the deposited layer.

Furthermore, with regard to the formation of a (001) preferred orientation of the deposited layer it has been found advantageous if the target has a minimum purity of at least 99.5% or even at least 99.9%. Such targets in particular include no or only small amounts of oxygen. In this way a formation of oxynitrides caused by incorporation of oxygen is avoided. This is of particular importance with respect to the crystal growth of the AlN crystallites which would be affected by oxynitrides. Thus, preferably, a coating can be obtained which has an oxygen content of not more than 10 at %, more preferably not more than 5 at %, or even not more than 2 at %.

The sputtering process may comprise continuous deposition on the substrate. Alternatively, the sputtering process may be performed such that the deposited layers have interfaces or consist of interfaces which are caused by the processing upon retraction from the coating area.

The substrate provided in step a) may for instance be a glass ceramic, a sapphire glass, a borosilicate glass, an aluminosilicate glass, a soda-lime glass, a fused silica glass, a lithium aluminosilicate glass, an optical glass, and/or a crystal for optical purposes.

In a preferred embodiment, the metal target contains, in addition to aluminum, at least one of elements silicon, boron, zirconium, titanium, or carbon. These additional elements in addition to aluminum are referred to as a dopant in the context of the invention. Preferably, the proportion of aluminum in the target is greater than 50 wt %, more preferably greater than 60 wt %, and most preferably greater than 70 wt %.

In one embodiment of the invention, the substrate provided in step a) has a decorative layer and/or an adhesion promoting layer. For example, the coating may be applied on at least partially decorated areas and will remain resistant even at high application temperatures. Even flat facets can be coated without incurring visual changes and exhibit good mechanical resistance and can be cleaned easily, i.e. especially with no or only little effort and/or use of solvents. Thus, the coatings exhibit a good easy-to-clean effect.

Another embodiment of the invention comprises a decor that is applied to the coating of the invention, e.g. as a logo or lettering.

According to one embodiment of the invention, the adhesion promoting layer includes nitrides, oxides, carbides, carbonitrides, and/or oxynitrides of one or more elements selected from the group comprising aluminum, silicon, boron, zirconium, titanium, nickel, and carbon.

Adhesion promoting layers are preferably applied by a sputtering process.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will now be described in more detail by way of exemplary embodiments and with reference to the drawings, wherein.

DETAILED DESCRIPTION

Figure 1:
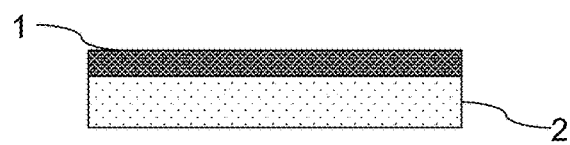
FIG. 1 is a schematic view of a substrate coated according to the invention.

FIG. 1 schematically illustrates a substrate coated according to the invention. Here, the substrate 2 is coated with a hard material layer 1. Hard material layer 1 comprises crystalline AlN, and the AlN crystallites have a (001) preferred orientation. Due to the layer properties of hard material layer 1, in particular its great hardness and high modulus of elasticity, a layer thickness of the hard material layer of <100 nm, preferably even only 50 nm already suffice to obtain an easy-to-clean effect and to protect the substrate 2 against mechanical stress and from scratches. However, layers of greater thickness of up to 2000 nm are likewise conceivable.

Figure 2:
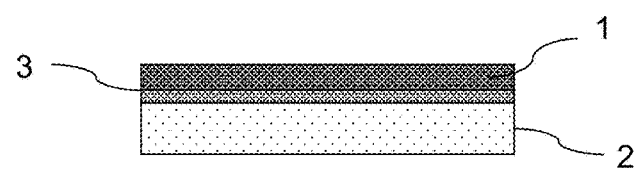
FIG. 2 is a schematic view of an embodiment of the invention comprising an additional adhesion promoting layer.

FIG. 2 schematically shows a further exemplary embodiment in which a further layer 3 is disposed between substrate 2 and hard material layer 1. The additional layer 3 may be a decorative layer or an adhesion promoting layer, for example. Layers 3 comprising several sublayers, such as a decorative layer and an adhesion promoting layer, are likewise possible. The substrate may be completely or only partially covered by layer 3. In this case, the hard material layer is disposed above the additional layer 3, that means the additional layer 3 is therefore located between substrate 2 and hard material layer 1. In embodiments in which the additional layer 3 is an adhesion promoting layer, layer 3 is preferably a doped AlN layer or a mixed layer. Depending on the composition of the adhesion promoting layer, the latter may for example have a coefficient of thermal expansion between the coefficients of thermal expansion of the substrate 2 and that of the hard material layer 1. In this way the adhesion promoting layer 3 allows to reduce stresses between substrate 2 and hard material layer 1. The adhesion promoting layer 3 preferably has a thickness in a range from 1 to 900 nm, more preferably in a range from 1 to 500 nm, most preferably in a range from 1 to 50 nm. According to one exemplary embodiment, the coated substrate has, as the adhesion promoting layer 3, an $Al_2O_3$ coating with a layer thickness of 50 nm between glass substrate 2 and hard material layer 1.

Figure 3:
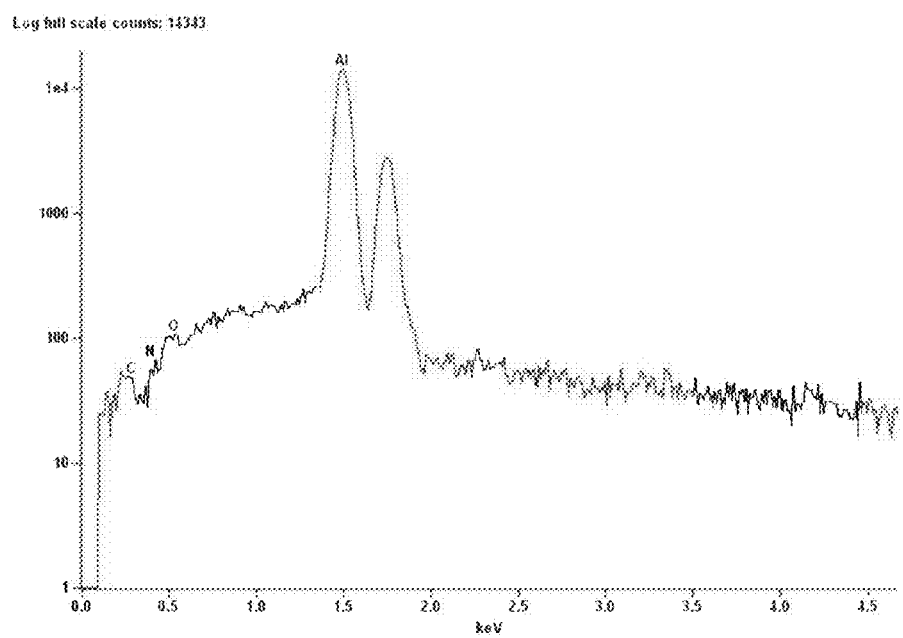
FIG. 3 shows an EDX spectrum of one exemplary embodiment.

FIG. 3 shows the spectrum of energy dispersive X-ray (EDX) spectroscopy or energy dispersive x-ray analysis of one exemplary embodiment of a hard material layer according to the invention. The hard material layer in this exemplary embodiment is an AlN layer alloyed or doped with silicon.

Figure 4:
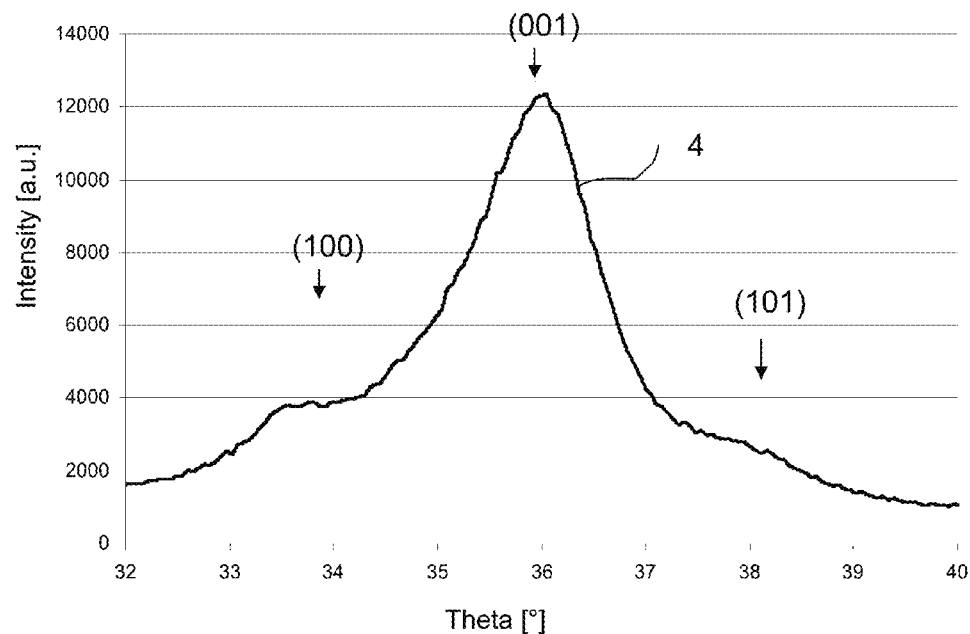
FIG. 4 shows an XRD spectrum of a further exemplary embodiment.

FIG. 4 shows the X-ray diffraction (XRD) spectrum of an exemplary embodiment of a substrate coated according to the invention. In this exemplary embodiment, an $SiO_2$ substrate was coated with an AlN-based hard material layer, and an XRD spectrum of the coated substrate was acquired. Spectrum 4 has three reflections that can be associated with the three orientations (100), (001), and (101) of the hexagonal crystal structure of AlN. It can clearly be seen that the hard material layer predominantly has a (001) preferred orientation. The corresponding reflection at 36° is much more pronounced than the reflections of the (100) orientation (33.5°) and of the (101) orientation (38°).

The proportion of the crystal structure exhibiting the (001) preferred orientation can be determined from spectrum 4 as follows:

| $I_{(001)}$ [counts] | $I_{(100)}$ [counts] | $I_{(101)}$ [counts] |
|---|---|---|
| 12,312 | 3,717 | 2,678 |

$x_{(001)} = I_{(001)}/(I_{(001)} + I_{(100)})$; and $y_{(001)} = I_{(001)}/(I_{(001)} + I_{(101)})$ In this exemplary embodiment, fraction $x_{(001)}$ is 0.76, and fraction $y_{(001)}$ is 0.82.

Figure 5:
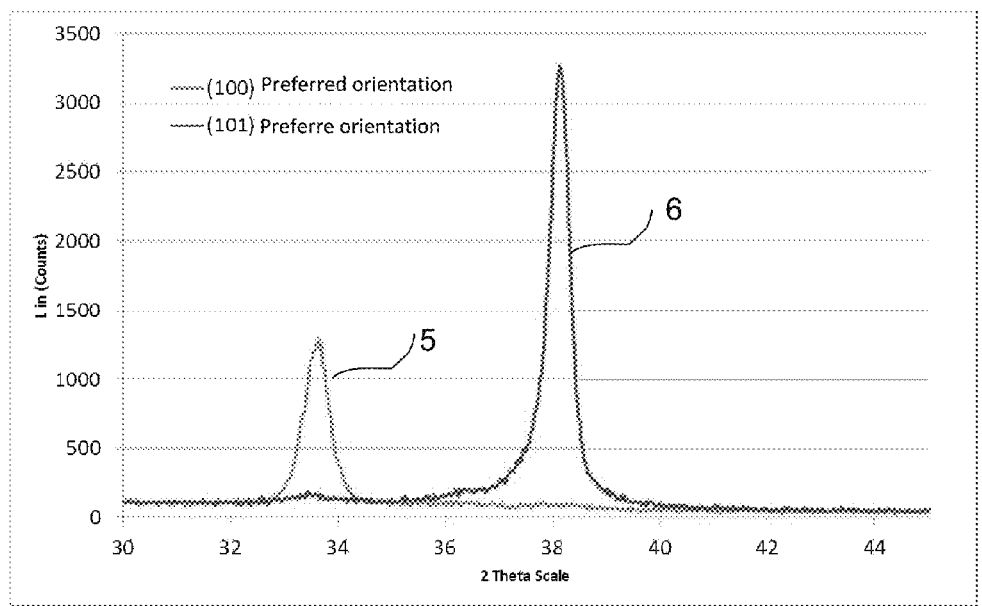
FIG. 5 shows XRD spectra of two AlN-based layers with (100) and (101) preferred orientation as comparative examples.

FIG. 5 shows XRD spectra of hard material layers which actually have a similar composition as that of the exemplary embodiment shown in FIG. 4, but exhibit other preferred orientations of the crystal structure. Spectrum 5 can be associated with a comparative example having a (100) preferred orientation, and spectrum 6 can be associated with a comparative example having a (101) preferred orientation.

The hard material layer exhibiting the (100) preferred orientation (curve 6) was deposited with a high target-substrate spacing (>15 cm) and low sputtering power of 13 $W/cm^2$. Processing temperature was about 100° C. The hard material layer exhibiting the (101) preferred orientation (curve 5) was deposited at an even lower sputtering power of 9.5 $W/cm^2$. The target-substrate spacing and the processing temperature were similar to the deposition conditions of the hard material layer exhibiting the (100) preferred orientation.

Figure 6:
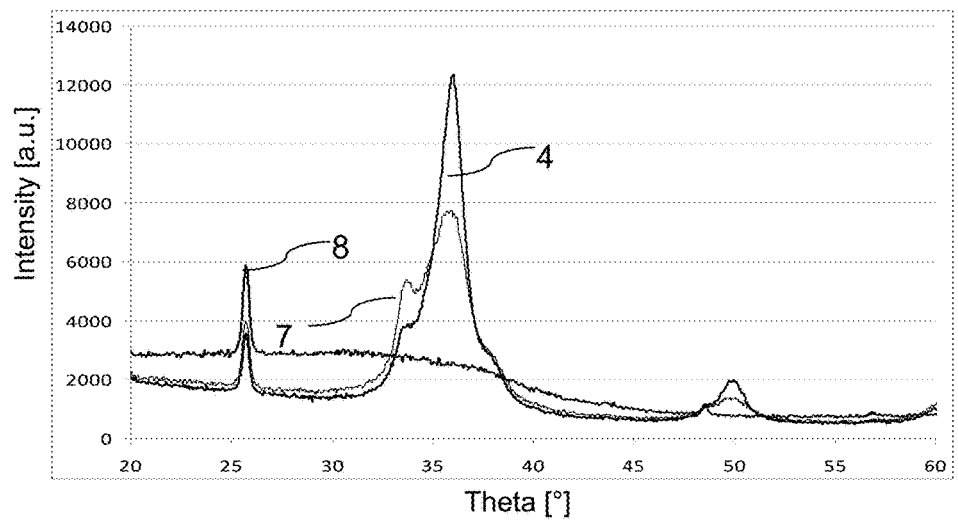
FIG. 6 shows XRD spectra of two crystalline exemplary embodiments and one exemplary embodiment with an amorphous AlN-based layer.

FIG. 6 shows the X-ray diffraction (XRD) spectra of two crystalline exemplary embodiments 4 and 7 and of an amorphous sample 8. Exemplary embodiment 7 is an AlN-based hard material layer with an $x_{(001)}$ proportion of 0.6 and an $y_{(001)}$ proportion of 0.73. Thus, the proportion of the (001) orientation is less than in exemplary embodiment 4. Comparative Example 7 was deposited at a sputtering power in a range of more than 15 $W/cm^2$ with a low target-substrate spacing ranging from 10 to 12 cm. Processing temperature was 250° C. Example 8 is an amorphous AlN hard material layer.

Figure 7:
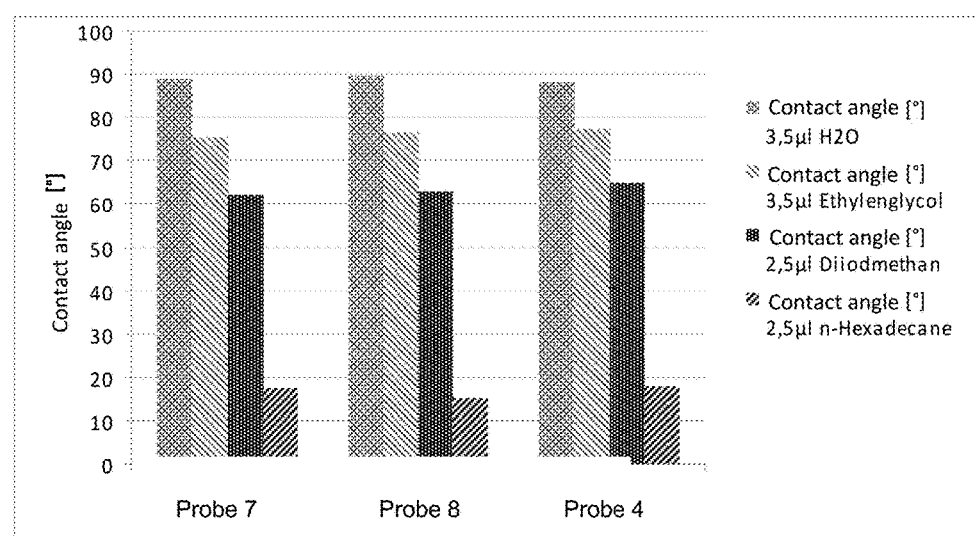
FIG. 7 is a graphic representation of contact angles of the AlN-based samples shown in FIG. 6.

For examples 4, 7, and 8 the contact angles for water, ethylene glycol, diiodomethane, and n-hexadecane were determined. For determining the contact angles, the samples were first cleaned and stored at room temperature for 12 hours so that the detergent completely evaporated. Then, 3.5 µl of the liquids listed in Table 1 were applied to each of the sample surfaces, and the contact angle was determined in accordance with DIN 55660-2. The results are shown in FIG. 7.

TABLE 1

Contact angles of samples 4, 7, and 8

| | Contact angle [°] | | | |
|---|---|---|---|---|
| Sample | Water | Ethylene glycol | Diiodomethane | n-Hexadecane |
| 4 | 88 | 77 | 65 | 18 |
| 7 | 89 | 75 | 62 | 18 |
| 8 | 90 | 77 | 63 | 15 |

The hard material layers 4, 7, and 8 exhibit relatively large contact angles for the polar substances water, ethylene glycol, and diiodomethane, so that the coatings are not or only slightly wetted by the aforementioned liquids.

Figure 8:
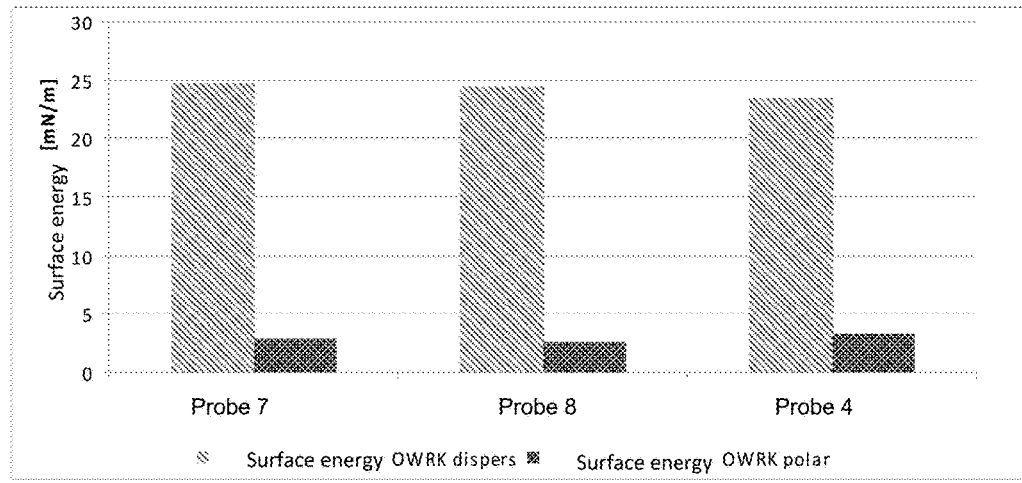
FIG. 8 is a graphic representation of the surface energy of the AlN-based samples shown in FIG. 6.

FIG. 8 graphically illustrates surface energies OWRK polar and OWRK dispersive. The OWRK polar surface energy was calculated from the contact angle for water, the dispersive surface energy was calculated from all of the contact angles listed in Table 1.

Figure 9:
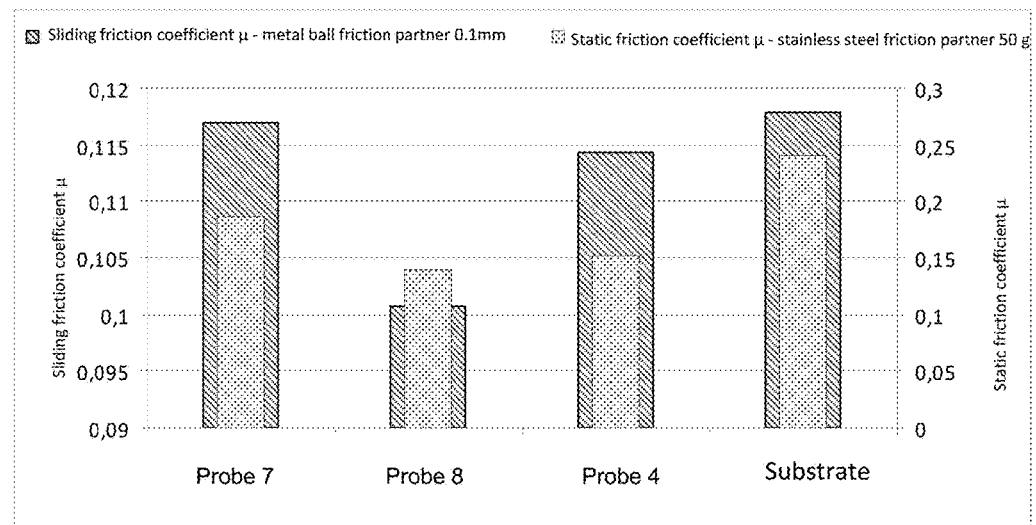
FIG. 9 is a graphic representation of static and sliding friction of the AlN-based samples shown in FIG. 6.
Figure 10:
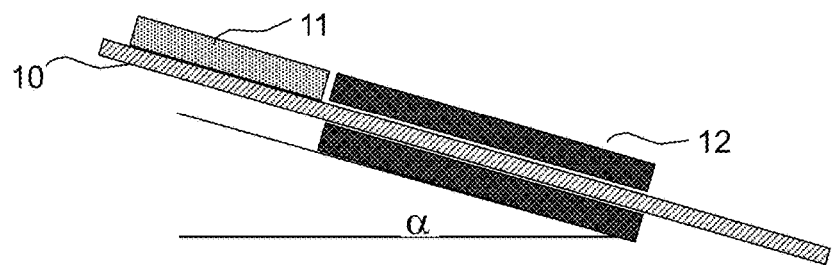
FIG. 10 schematically illustrates the experimental setup for determining the coefficient of static friction.

FIG. 9 shows sliding friction and static friction values of samples 4, 7, 8 and of the non-coated substrate. The substrate is a glass ceramic, that means it has a very smooth surface. The coefficient of sliding friction was determined using a metal ball with a diameter of 1 mm as a friction partner. The coefficient of static friction was determined using an inclined plane 10 and a stainless steel plate 11 with a weight 12 of 50 g. A schematic test setup for determining the coefficient of static friction is illustrated in FIG. 10. The test body will begin to slide when the downward force is equal to the maximum adhesive force. At an angle α the adhesive force is overcome, the coefficient of static friction can be determined from tan α.

Surprisingly, sliding and static friction values for samples 4 and 7 are lower than for the non-coated glass ceramic (substrate). In particular static friction can be reduced by the coating. Sample 8 has the lowest sliding and static friction values.

Figure 11A:
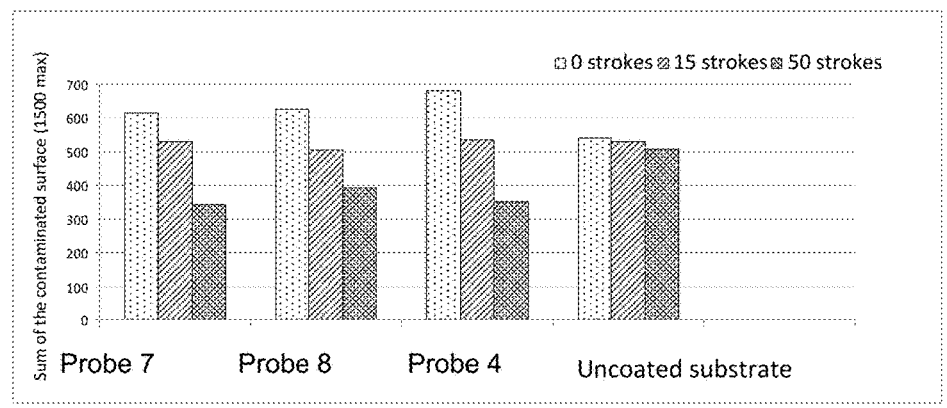
FIGS. 11a and 11b are graphic representations of the sticking tests performed on different exemplary embodiments and on a non-coated substrate as a comparative example.
Figure 11B:
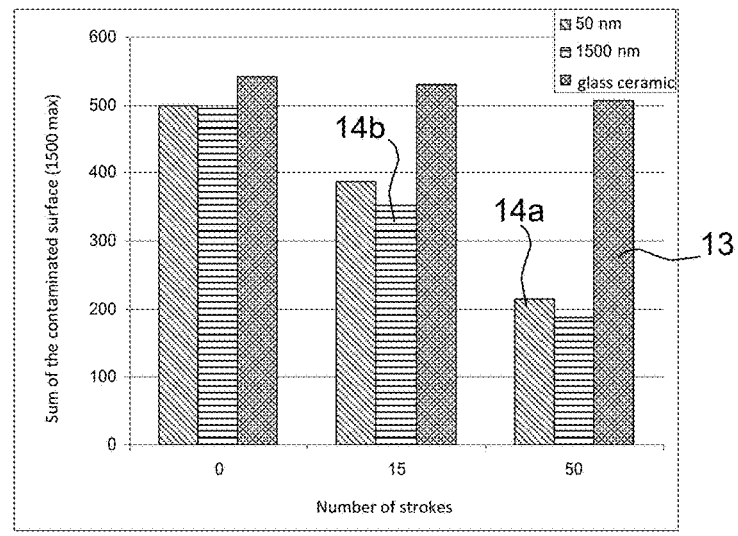

FIGS. 11a and 11b show the results of a so-called sticking test. The sticking test is intended to evaluate the cleanability of a respectively coated substrate with regard to contamination that is caused in practice if the coated substrate is employed as a cooktop, for example. For this purpose, the samples to be tested are first cleaned. Then, a defined amount of a mixture including several components is applied to the sample surface. The mixture contains components with a high sugar content, components with a high protein content, and components with a high fat content. The so treated samples are heated using a hot plate so that the mixture is baked so as to stick on the sample. Then, a sponge cloth impregnated with a cleaning liquid is swiped over the sample surface of the cooled sample with a load of 4.25 kg, and the decrease of contamination for this cleaning stroke is determined.

FIG. 11A shows the results of such a sticking test performed on samples 7, 8, and 4, and on a non-coated substrate 13 as a comparative example. In the case of samples 7, 8, and 4, the contaminated surface area is significantly reduced already with 15 strokes, after cleaning with 50 strokes the contamination area has almost halved. In case of the non-coated glass substrate, by contrast, this area could only be reduced by less than 10% even after 50 strokes.

FIG. 11B illustrates the results of the sticking test on a coating 14 according to the invention in dependence on layer thickness thereof. The corresponding values are shown in Table 2 below.

TABLE 2

Results of sticking test shown in FIG. 11b

| Sample | Layer thickness | Number of cleaning steps | Total surface contamination |
|---|---|---|---|
| 14a | 50 nm | 0 | 500 |
|  |  | 15 | 387 |
|  |  | 50 | 214 |
| 14b | 1500 nm | 0 | 495 |
|  |  | 15 | 352 |
|  |  | 50 | 188 |
| 13 | non-coated glass ceramic | 0 | 541 |
|  |  | 15 | 530 |
|  |  | 50 | 507 |

Sample 14 has a thickness of only 50 nm here, the thickness of sample 14b is 1.5 μm. Again, a non-coated glass ceramic substrate serves as a comparative sample. From FIG. 11b it becomes clear that both samples 14a and 14b exhibit good cleanability. Surprisingly, the removal of contaminations per cleaning operation as a measure of cleanability is comparable for samples 14a and 14b, although the layer thickness of sample 14b is substantially greater. For both samples, the degree of contamination can be reduced by about ⅓ of the initial value by 15 strokes. Thus, sample 14a with a layer thickness of only 50 nm also exhibits very good cleanability.

Figure 12A:
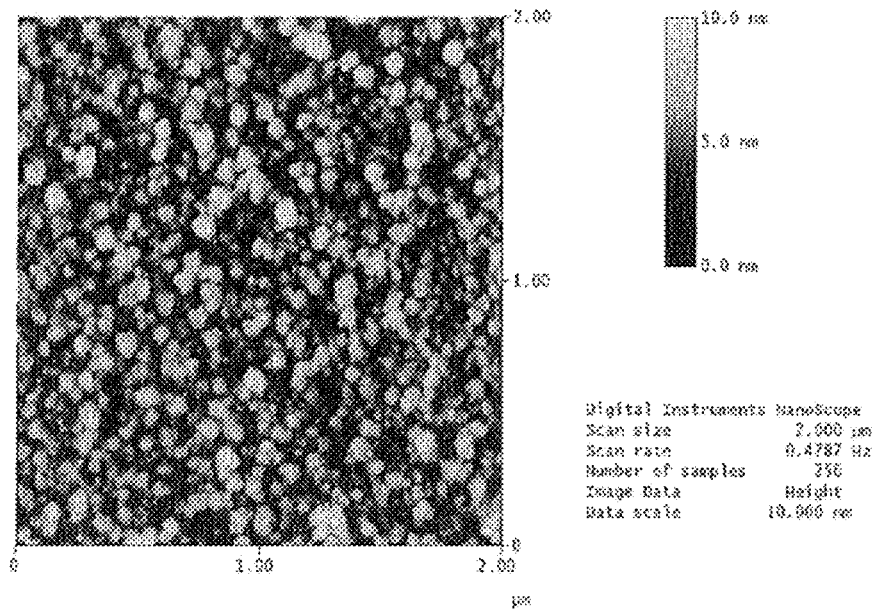
FIGS. 12a to 12c are AFM images of the AlN-based samples shown in FIG. 6.
Figure 12B:
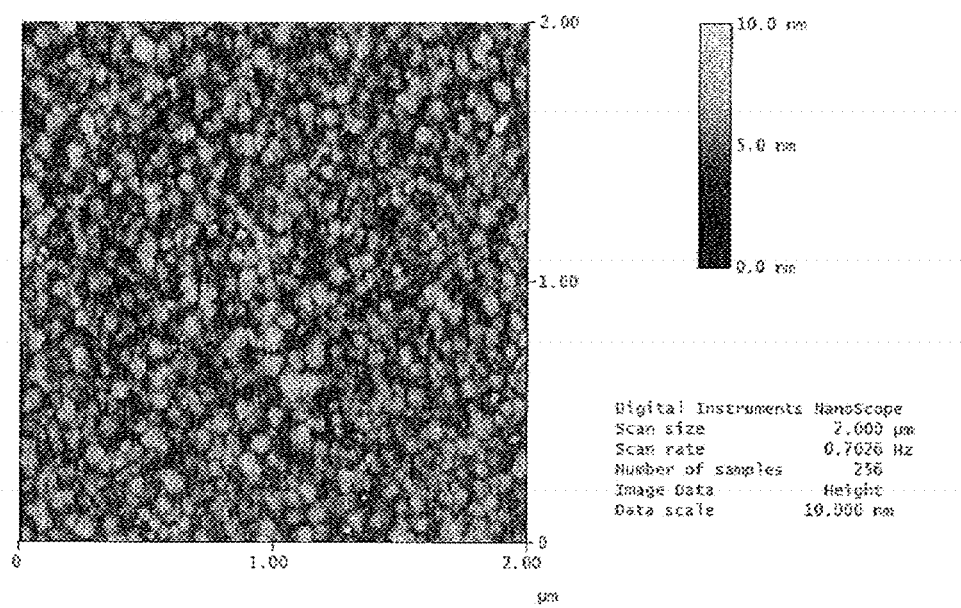
Figure 12C:
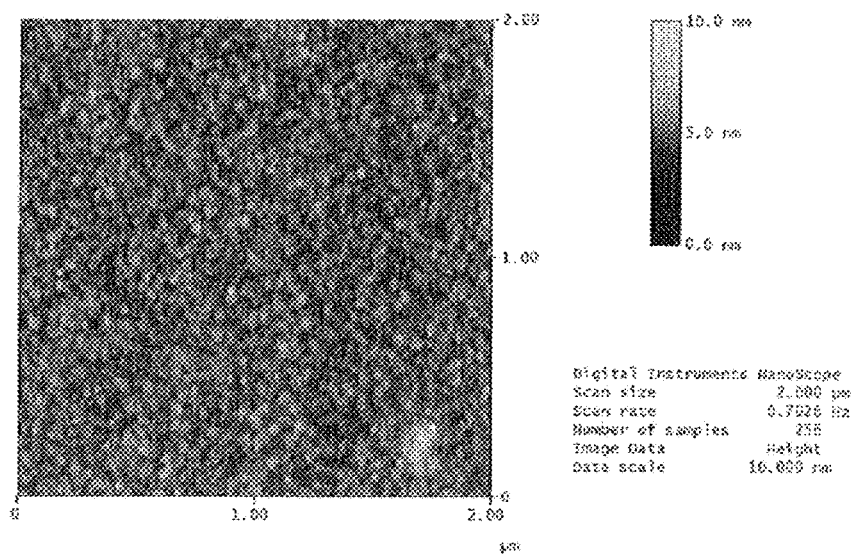

FIGS. 12a to 12c show AFM images of the samples 4, 7, and 8. A characterization of the surface texture and determination of the roughness of the coatings was accomplished by AFM. The samples to be tested were cleaned by blowing and discharged immediately before the measurement. Sample preparation was performed according to the ASTM E 1829 2009-01 and ASTM E 1078 2009-01 standards. The roughness values were determined in accordance with standards ASTM E 2382 2004-01, AAW_OF_0002, and ISO TR 14187 2011-08. The size of the measurement area was 2 μm×2 μm. The roughness values obtained in this manner are listed in Table 3 below.

TABLE 3

Roughness values

| Sample | RMS [nm] | Ra [nm] |
|---|---|---|
| 4 | 1.1 | 0.9 |
| 7 | 1.9 | 1.5 |
| 8 | 0.6 | 0.4 |

Figure 13A:
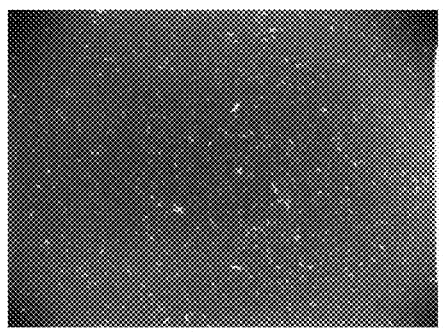
FIGS. 13a to 13c are photographs of different coated substrates with different preferred orientations after a mechanical stress test with sand.
Figure 13B:
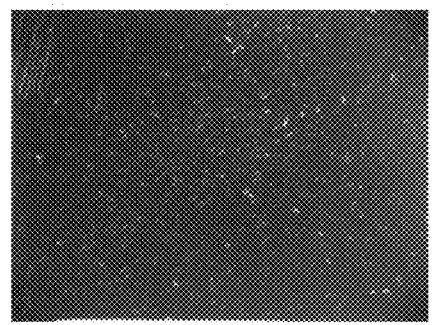
Figure 13C:
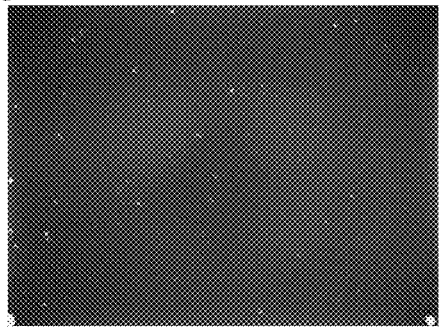

FIGS. 13a to 13c illustrate the influence of the preferred orientation of the crystal structure on the mechanical resistance of the respective hard material layers. FIGS. 13a to 13c are photographs of different coated substrates after a stress test with sand. In this test sand was placed on the coated substrates and was then loaded with load bodies and oscillated 100 times in a container. FIG. 13a shows the photograph after the stress test of a sample having a coating with (101) preferred orientation, FIG. 13b shows a corresponding photograph of a sample with (100) preferred orientation, and FIG. 13c shows a photograph of a sample with a (001) preferred orientation according to the invention. As can be clearly seen from FIGS. 13a to 13c, the samples exhibiting the (101) and (100) preferred orientations have a much higher number of scratches after the stress test than the sample having a (001) preferred orientation.

It has thus been disclosed that the invention in particular relates to a substrate having a coating that increases scratch resistance and which exhibits improved cleanability. The coating preferably comprises at least one high refractive index transparent hard material layer and especially includes aluminum nitride, inter alia. The coating has a contact angle for water of >75°. The invention also relates to a method for producing such a coating.

What is claimed is:

1. A coated substrate comprising:
   a substrate; and
   a coating on the substrate, the coating being a coating, the coating comprising a transparent hard material layer having a refractive index in a range from 1.8 to 2.3 at a wavelength of 550 nm, wherein the hard material layer includes aluminum nitride and a material selected from a group consisting of nitrides, carbides, carbonitrides, and any combinations thereof, and wherein the coating has a contact angle for water of greater 75°.

2. The coated substrate as claimed in claim 1, wherein the hard material layer comprises crystalline aluminum nitride with a hexagonal crystal structure exhibiting a predominantly (001) preferred orientation.

3. The coated substrate as claimed in claim 2, wherein the hexagonal crystal structure exhibiting the (001) preferred orientation has a proportion of:

$$x_{(001)} = I_{(001)}/(I_{(001)} + I_{(100)})$$

and/or $$y_{(001)} = I_{(001)}/(I_{(001)} + I_{(101)})$$

as determined by an XRD measurement of the coating, that is greater than 0.5.

4. The coated substrate as claimed in claim 2, wherein the hexagonal crystal structure has an average crystallite size is at most 25 nm.

5. The coated substrate as claimed in claim 1, wherein the coating has a mean roughness of less than 1.3 nm and/or a RMS roughness of less than 2 nm.

6. The coated substrate as claimed in claim 1, wherein the coating has a coefficient of static friction of less than 0.3 and/or a coefficient of sliding friction of less than 0.2.

7. The coated substrate as claimed in claim 1, wherein the coating exhibits a contact angle for water of ≥80° and/or a contact angle for ethylene glycol of ≥70°, and/or a contact angle for diiodomethane of ≥55°.

8. The coated substrate as claimed in claim 1, wherein the coating exhibits polar and/or dispersive surface energy of less than 50 mN/m.

9. The coated substrate as claimed in claim 1, wherein the coating exhibits a modulus of elasticity at a test load of 10 mN from 80 to 250 GPa and/or wherein the coating has a ratio of hardness to the modulus of elasticity of at least 0.08.

10. The coated substrate as claimed in claim 1, wherein the aluminum nitride of the hard material layer is doped with one or more nitrides and/or carbides and/or carbonitrides of elements selected from the group consisting of silicon, boron, zirconium, titanium, nickel, chromium, and carbon.

11. The coated substrate as claimed in claim 10, wherein the aluminum content in the hard material layer, based on the dopant material, is greater than 50 wt %.

12. The coated substrate as claimed in claim 1, wherein the hard material layer has a proportion of oxygen in that is at most 10 at %.

13. The coated substrate as claimed in claim 1, wherein the hard material layer has a thickness from 1 to 2000 nm.

14. The coated substrate as claimed in claim 1, wherein the substrate selected from the group consisting of a glass ceramic, a LAS glass ceramic, a glass, a sapphire glass, a borosilicate glass, an aluminosilicate glass, a soda-lime glass, a synthetic quartz glass, a lithium aluminosilicate glass, an optical glass, and an optical crystal.

15. The coated substrate as claimed in claim 1, wherein the substrate is a glass ceramic having a coefficient of thermal expansion $\alpha_{2\ 0\text{-}300}$ of less than $2*10^{-6}$ $K^{-1}$.

16. The coated substrate as claimed in claim 1, wherein the substrate further comprises decorated areas, at least in sections thereof, and wherein the decorated areas are disposed between the substrate and the coating.

17. The coated substrate as claimed in claim 1, further comprising an adhesion promoting layer arranged between the substrate and the coating.

18. The coated substrate as claimed in claim 1, wherein the hard material layer has a degree of crystallization of at least 50%.

19. A coated substrate comprising:
a substrate; and
a coating on the substrate, the coating comprising a transparent hard material layer with a refractive index in a range from 1.8 to 2.3 at a wavelength of 550 nm, wherein the coating has a contact angle for water of greater 75°, wherein the hard material layer comprises aluminum nitride, and wherein the coating has a mean roughness of less than 1.3 nm and/or a RMS roughness of less than 2 nm.

20. A coated substrate comprising:
a substrate, the substrate comprising a glass ceramic having a coefficient of thermal expansion $\alpha_{2\ 0\text{-}300}$ of less than $2*10^{-6}$ $K^{-1}$; and
a coating on the substrate, the coating comprising a transparent hard material layer with a refractive index in a range from 1.8 to 2.3 at a wavelength of 550 nm, wherein the hard material layer includes aluminum nitride, and wherein the coating has a contact angle for water of greater 75°.

21. A coated substrate comprising:
a substrate;
a coating on the substrate, the coating comprising a transparent hard material layer with a refractive index in a range from 1.8 to 2.3 at a wavelength of 550 nm, wherein the hard material layer includes aluminum nitride, and wherein the coating has a contact angle for water of greater 75°; and
one or more decorated areas on the substrate, the one or more decorated areas being disposed between the substrate and the coating.

* * * * *